US010174800B2

(12) United States Patent
Malki et al.

(10) Patent No.: US 10,174,800 B2
(45) Date of Patent: Jan. 8, 2019

(54) FORCE TRANSMISSION DEVICE, TAPPET, AND METHOD OF MANUFACTURE

(71) Applicant: Meritor Heavy Vehicle Braking Systems (UK) Limited, Cwmbran, Gwent (GB)

(72) Inventors: Refaat Malki, Gwent (GB); Martin Taylor, Gwent (GB)

(73) Assignee: Meritor Heavy Vehicle Braking Systems (UK) Limited, Cwmbran, Gwent (GB)

( * ) Notice: Subject to any disclaimer, the term of this patent is extended or adjusted under 35 U.S.C. 154(b) by 5 days.

(21) Appl. No.: 15/397,350

(22) Filed: Jan. 3, 2017

(65) Prior Publication Data

US 2017/0114850 A1    Apr. 27, 2017

Related U.S. Application Data

(63) Continuation of application No. 14/621,725, filed on Feb. 13, 2015, now Pat. No. 9,568,060, which is a
(Continued)

(30) Foreign Application Priority Data

Jun. 22, 2011   (GB) .................................. 1110515.2

(51) Int. Cl.
*F16D 65/56*    (2006.01)
*B21K 7/14*     (2006.01)
(Continued)

(52) U.S. Cl.
CPC .............. *F16D 65/568* (2013.01); *B21K 7/14* (2013.01); *F16D 65/0068* (2013.01);
(Continued)

(58) Field of Classification Search
CPC .... F16D 65/0068; F16D 65/56; F16D 65/568; F16D 2065/785; F16D 2125/40
(Continued)

(56) References Cited

U.S. PATENT DOCUMENTS 3,651,896 A    3/1972   Fannin
3,812,737 A *  5/1974   Campbell ........... F16H 55/0853
                                                      74/425
(Continued)

FOREIGN PATENT DOCUMENTS

DE    4416175 A1    11/1995
EP    0648952 A1    4/1995
(Continued)

OTHER PUBLICATIONS

European Patent Office, Extended European Search Report for the corresponding European Patent Application No. 17158543.3 dated May 18, 2017.
(Continued)

*Primary Examiner* — Thomas W Irvin
(74) *Attorney, Agent, or Firm* — Brooks Kushman P.C.

(57) ABSTRACT

A force transmission device, tappet, and method of manufacture. The tappet may include a shaft portion for transmission of a thrust loading from an actuating member to a piston of a disc brake and a gear portion for transmission of rotary motion to the shaft. The gear portion may be formed as a separate piece from the shaft portion.

16 Claims, 8 Drawing Sheets

Related U.S. Application Data continuation of application No. 13/529,092, filed on Jun. 21, 2012, now abandoned.

(51) Int. Cl.
*F16D 65/00* (2006.01)
*F16D 65/78* (2006.01)
*F16D 125/40* (2012.01)
*F16H 25/20* (2006.01)

(52) U.S. Cl.
CPC ........ *F16D 65/56* (2013.01); *F16D 2065/785* (2013.01); *F16D 2125/40* (2013.01); *F16H 25/20* (2013.01)

(58) Field of Classification Search
USPC ......... 188/71.4, 71.7, 72.1, 72.4, 72.7, 72.8, 188/73.1, 196 V, 264 G
See application file for complete search history.

(56) References Cited

U.S. PATENT DOCUMENTS

| | | | |
|---|---|---|---|
| 4,454,933 A | 6/1984 | Hunnicutt et al. | |
| 4,502,572 A | 3/1985 | Davidson et al. | |
| 5,090,520 A | 2/1992 | Gockel et al. | |
| 5,379,867 A | 1/1995 | Macke et al. | |
| 5,794,738 A | 8/1998 | Forni et al. | |
| 5,819,884 A | 10/1998 | Giering | |
| 6,311,809 B1 | 11/2001 | Thomas et al. | |
| 6,336,686 B2 | 1/2002 | Thomas et al. | |
| 6,354,407 B1 * | 3/2002 | Heinlein ................. | F16D 65/18 188/106 F |
| 7,000,742 B2 * | 2/2006 | Heinlein ............. | F16D 65/0978 188/71.9 |
| 7,152,722 B1 * | 12/2006 | Banks .................... | F16D 7/021 188/71.8 |
| 7,205,688 B2 * | 4/2007 | Otaki ...................... | F16D 65/18 188/156 |
| 7,331,431 B2 * | 2/2008 | Fischer ................. | F16D 65/183 188/196 D |
| 7,591,350 B2 | 9/2009 | Bieker et al. | |
| 7,614,779 B2 * | 11/2009 | Ta ........................ | A47J 43/044 366/197 |
| 7,950,502 B2 | 5/2011 | Baumgartner et al. | |
| 9,200,688 B2 * | 12/2015 | Howard ............... | F16D 55/2255 |
| 9,382,958 B2 * | 7/2016 | Camilo-Martinez ........................ | F16D 65/183 |
| 9,568,060 B2 * | 2/2017 | Malki .................... | F16D 65/568 |
| 2009/0200120 A1 * | 8/2009 | Baumgartner ........ | F16D 65/092 188/72.2 |
| 2010/0152971 A1 * | 6/2010 | Shiino .................. | B62D 5/0463 701/41 |
| 2012/0073912 A1 * | 3/2012 | Camilo-Martinez ........................ | F16D 65/183 188/71.7 |
| 2013/0240305 A1 * | 9/2013 | Thomas ................ | F16D 65/183 188/72.4 |
| 2014/0166412 A1 | 6/2014 | Howard et al. | |
| 2018/0135703 A1 * | 5/2018 | Ponikiewski ............. | F16D 1/10 |

FOREIGN PATENT DOCUMENTS

| | | |
|---|---|---|
| GB | 2444942 A | 6/2008 |
| JP | H01122764 A | 5/1989 |
| JP | 2000283190 A | 10/2000 |
| JP | 2009127737 A | 6/2009 |
| JP | 2010007688 A | 1/2010 |
| JP | 2010255652 A | 11/2010 |
| WO | 9612900 A1 | 5/1996 |

OTHER PUBLICATIONS

European Patent Office, Communication for related European Patent No. 2538105 B1, dated Feb. 7, 2018.
European Patent Office, Extended European Search Report for related European Patent Application No. 12172877.8, dated Jan. 9, 2013.

* cited by examiner

FORCE TRANSMISSION DEVICE, TAPPET, AND METHOD OF MANUFACTURE

CROSS-REFERENCE TO RELATED APPLICATIONS

This application is a continuation of U.S. patent application Ser. No. 14/621,725, filed Feb. 13, 2015, which is a continuation of U.S. patent application Ser. No. 13/529,092, filed Jun. 21, 2012, which, in turn, claims the benefit of GB Application No. 1110515.2, filed Jun. 22, 2011, the disclosures of which are hereby incorporated in their entirety by reference herein.

TECHNICAL FIELD

The present invention relates to a force transmission device. More specifically, but not exclusively, the present invention relates to an adjuster mechanism for air actuated disc brakes of the type typically used on heavy vehicles such as trucks and buses. The present invention further relates to a disc brake caliper incorporating a force transmission device, a tappet and a cover plate.

BACKGROUND

Force transmission devices of disc brakes, particularly air actuated disc brakes, are mounted within a caliper of the brake and transmit the actuation force from the actuator to friction elements of the brake via tappets or pistons. Typically, force transmission devices also incorporate an adjuster mechanism to compensate for wear of the friction elements in use.

Various arrangements of force transmission device have been employed by air disc brake (ADB) manufacturers. Knorr-Bremse utilise SB and SN series brakes utilise externally threaded spindles that are screwed into a cross-member that is actuated by an operating shaft. The spindles are hollow and have a non-circular inner profile that interfaces with an adjuster mechanism to screw out the spindles to account for wear of the brake pads and maintain a desired running clearance between the brake pads and rotor. The outer threads are problematic for effective sealing of the interior of the brake caliper. An example of this arrangement can be seen in e.g., EP0648952.

The present applicant's ELSA2 series brakes utilise two-part pistons/tappets. The outer piston is smooth and has a trilobular profile to prevent its rotation within a complementary trilobular bush within a fixed guide plate. The inner tappet is threaded with respect to the outer piston such that rotation of the inner tappet causes the rotationally fixed outer piston to extend. By contrast with the Knorr-Bremse arrangement, the operating shaft of the ELSA2 brake transmits the actuating force directly to the inboard end face of the inner tappets.

Whilst the ELSA2 brake has been found to be highly reliable and robust in service the applicant has recognised that it is desirable to reduce the cost associated with machining the trilobular surfaces, the cost of providing seals to seal against the trilobular surfaces, and the cost of providing an inner tappet that is both a relatively complex shape and must be suitably treated to withstand the forces imposed during actuation. In addition the piston housing is presently formed from an aluminium casting having relatively costly trilobular machinings. The casting also acts as a cover plate for the rotor side of the housing which requires additional treatment to avoid corrosion issues.

The present invention seeks to overcome or at least mitigate the problems of the prior art.

SUMMARY

According to the present invention there is provided a force transmission device for a disc brake operable to move a friction element of the brake into engagement with a rotary brake disc along a first axis in response to a loading from an actuating member, the device comprising: a guide member having a generally cylindrical guide form; a piston comprising a complementary generally cylindrical outer sliding surface slideable within the guide member, wherein; an anti-rotation formation is provided between the guide member and the piston, the formation comprising a recess extending generally parallel to the first axis and a complementary projection. This arrangement advantageously permits simpler machining of piston and guide member surfaces.

Preferably the recess is provided on the guide member and the projection provided on the piston. More preferably the projection is arranged proximate an end of the piston remote from the friction element. This simplifies sealing of the piston.

At least one inner tappet may be located at least partially within the piston and may be advantageously arranged to cause the piston to extend to maintain a substantially constant running clearance in response to wear of the friction element. More preferably, extension of the piston is achieved by virtue of relative rotation of the tappet with respect to the piston.

Optionally, the guide member comprises a yoke. Preferably, the yoke is movable together with the piston during loading from the thrust member to apply the brake. Even more preferably, the yoke is further configured to transmit a return force to the piston to restore a running clearance between the rotor and friction element after a brake application.

The yoke may comprise two guide forms to guide two pistons.

The yoke optionally is further arranged to receive an adjuster assembly. The adjuster assembly is preferably located intermediate to the guide forms.

The yoke may be a die cast component, an extruded component or may be an assembly comprising multiple components.

A further aspect of the present invention disc brake caliper incorporating a force transmission device operable to move a friction element of the brake into engagement with a rotary brake disc along a first axis in response to a loading from an actuating member, the device comprising: a guide member having a generally cylindrical guide form; a piston comprising a complementary generally cylindrical outer sliding surface slideable within the guide member, wherein; an anti-rotation formation is provided between the guide member and the piston, the formation comprising a recess extending generally parallel to the first axis and a complementary projection, and further comprising an actuating member and a housing.

A third aspect of the present invention provides a tappet comprising a shaft portion for transmission of a thrust loading from an actuating member to a piston of a disc brake, the tappet further comprising a gear portion for transmission of rotary motion to the shaft, wherein the gear portion is formed as a separate piece from the shaft portion. This arrangement advantageously results in a piston that is simpler to manufacture.

The gear portion is preferably formed from lower strength material than the shaft. The gear portion is even more preferably formed from a selected one of the following materials: sintered metal, die cast metal, injection moulded metal, cast metal, injection moulded plastics.

The shaft is advantageously formed from a selected one of the following materials: forged metal, cast metal.

The shaft portion may define an axis, and the shaft portion and the gear portion comprise may complementary abutting surfaces in a direction transverse the axis. Preferably, the complementary abutting surfaces restrain movement of the gear portion toward an inboard end of the actuating member at which the actuating member is located.

The shaft and the gear comprise may comprise complementary abutting surfaces in a circumferential direction so as to restrict relative rotation of the gear with respect to the shaft.

A fourth aspect of the present invention provides a force transmission device incorporating a tappet comprising a shaft portion for transmission of a thrust loading from an actuating member to a piston of a disc brake, the tappet further comprising a gear portion for transmission of rotary motion to the shaft, wherein the gear portion is formed as a separate piece from the shaft portion.

The force transmission device may further comprise a resilient device to return the force transmission device to a brake-off position once the thrust loading is removed, and the force from the resilient device may acts through the gear to pre-load the gear against the shaft.

A fifth aspect of the present invention provides a cover plate for mounting over a rotor side opening in a housing in a disc brake caliper, and having at least one aperture therein through which a piston may extend and move a friction element into contact with a brake rotor.

The cover plate is preferably a pressed sheet metal component, preferably sheet steel and preferably further comprises at least one journal bearing form pressed therein.

The bearing form may be a plain bearing or may additionally comprise a bushing.

The bearing form may advantageously comprise a substantially circular wall extending away from a major plane of the cover plate and a second wall extending back towards the major plane to form a blind substantially cylindrical bore.

The cover plate preferably comprises a seal for connection to a piston overmoulded directly thereon.

The cover plate preferably comprises a peripheral seal overmoulded directly thereon.

A sixth aspect of the present invention provides disc brake caliper incorporating a caliper housing and a cover plate for mounting over a rotor side opening in the housing, and having at least one aperture therein through which a piston may extend and move a friction element into contact with a brake rotor.

The cover plate is advantageously adhesively bonded, welded, riveted or staked directly to the caliper housing.

A brake de-adjuster shaft is advantageously mounted on to the journal bearing form.

A wear adjuster shaft may be mounted on to the journal bearing form.

The cover plate is advantageously mounted to the housing in a preloaded state to accommodate deflections in the housing under heavy loads.

BRIEF DESCRIPTION OF THE DRAWINGS

Embodiments of the present invention will now be described in detail with reference to the accompanying figures in which.

DETAILED DESCRIPTION

Figure 1:
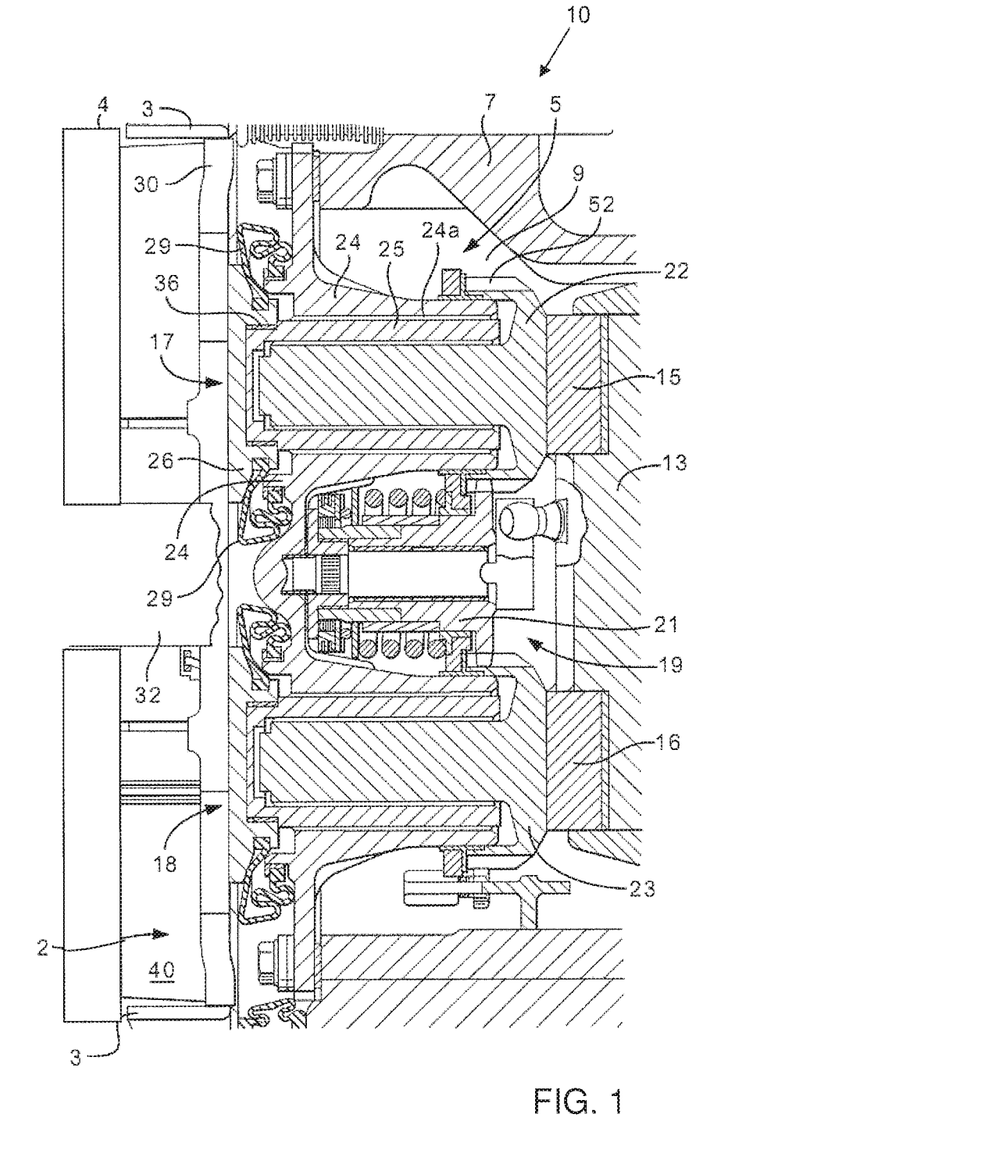
FIG. 1 is a horizontal cross-sectional view through a portion of a prior art disc brake incorporating a prior art force transmission device.

A prior art force transmission device 5 is illustrated in FIG. 1 and is of the type used in the present applicant's ELSA2 range. Briefly, the device is mounted within a chamber 9 of a housing 7 of a disc brake caliper 10. The housing 7 is adapted to mount a conventional air or other power actuator—e.g., an electromechanical actuator (not shown) on an external face thereof. An actuating lever (not shown) may perform an angular reciprocal swinging movement under the action of a thrust member of the power actuator, the lever being integral or attached to a rotary actuating member 13 (commonly referred to as an operating shaft) which is rotatably supported within the caliper. The member 13 is recessed to house respective cylindrical rollers 15, 16, the axes of which are offset from the rotary axis of the actuating member 13 and form an eccentric actuating arrangement. The rollers 15 and 16 bear against respective thrust assemblies, shown as adjustable piston assemblies, and indicated generally at 17 and 18 of the force transmission device 5.

Rotation of the lever and its connected member 13 causes actuating thrust to be applied via piston assemblies 17 and 18 to a directly actuated friction element 2 and, by reaction via the caliper 10, to an indirectly actuated friction element (not shown). The friction elements are mounted so as to face respective sides of a brake disc or rotor 4. The friction elements are received within openings in a brake carrier 3 fixed to a non-rotatable portion of a vehicle (e.g., the axle) to which the brake is mounted. The friction elements are thus restrained from circumferential and radial inward movement. Radial outward movement is restricted by pad springs 30 and a pad strap 32, as is well known.

An adjuster assembly is indicated generally at 19 and may be of any appropriate conventional type needing no detailed description. The adjuster responds to excessive movement of the friction element 2 (e.g., due to wear of friction material 40 in use) and produces resultant rotation of an adjuster shaft 21 via gear 52 which in turn rotates a pair of inner tappets 22 and 23 of the adjustable piston assemblies 17 and 18.

The piston assemblies 17 and 18 are of identical construction and operation. Thus only assembly 17 is described in greater detail. This assembly comprises a piston housing 24 comprising a trilobular bush 24a. A piston head 26 is mounted to a closed end portion of a piston shaft 25 having a trilobular external surface which is received in the bush 24*a* so as to be axially guided by the bush. The piston shaft 25 further has a threaded internal bore arranged to receive the inner tappet 22 having a corresponding external thread. The piston assemblies 17 and 18 are disposed with tappet heads 26 thereof adjacent to the friction element 2.

When force is applied by the brake actuator from the right in FIG. 1, the entire piston assembly slides along bore 24*a* to transmit the braking force to the friction element 2 via piston head 26. To adjust the length of the piston assembly 17, inner tappet 22 is rotated so as to cause relative axial movement between the inner tappet and the piston shaft 25 by virtue of the action of their mating threads. The trilobular configuration of the outer surface of the piston shaft 25 within the bush 24*a* prevents rotation of the piston shaft 25 relative to the housing 24, thereby ensuring that rotation of inner tappet 22 results in actual lengthening of the piston assembly 17.

In order to prevent the ingress of particles of dirt and debris into the sliding interface between the trilobular outer surface of the piston shaft 25 and bore 24A. A primary seal 29 is provided between the piston head 26 and housing 24.

Referring to FIGS. 2, 3, 4 and 7 a force transmission device 105 according to an embodiment of the present invention is shown. Like parts are illustrated by like numerals, but with the addition of the prefix "1". Only those parts that differ from the prior art of FIG. 1 are discussed in detail. Specifically, the rotor, friction elements, pad springs, pad strap, brake carrier and housing of the brake into which the force transmission device of the present invention are to be fitted are conventional. The general operation of the brake is similar, although the detail of a number of components differs as detailed below in significant ways.

The force transmission device 105 of the present invention comprises two identical piston assemblies 117 and 118 mounted within a yoke 124. The yoke 124 differs from the piston housing of the prior art in that it does not function as a cover plate to close off a rotor side opening 108 of housing 107, and is additionally movable parallel to axis A-A towards and away from the rotor together with the piston assemblies 117 and 118 during brake application and release. A separate pressed steel cover plate 128 closes off the opening 108, and is discussed in more detail below.

A resilient return element in the form of a helical return spring 142 is mounted between the cover plate 128 and a circular recess 144 of the yoke 124. The spring provides a force to return the piston assemblies and rotary actuating member to a brake-off position when the power actuator is released. The recess surrounds an aperture 146 arranged to accommodate an adjuster assembly 119.

The yoke 124 additionally comprises vertical and horizontal sliding surfaces 148 arranged to contact corresponding surfaces of the housing 107 or further components to guide the motion of the force transmission device 105. In particular, in this embodiment, one side of the yoke 124 is supported on a portion 192 of a de-adjuster mechanism 190. In other embodiments alternative profiled surfaces may locate and guide the yoke 124 in multiple axles.

As the yoke is not required to transmit the brake thrust from the rotary actuating member to the pistons, and because it is enclosed within the housing, it is not necessary for it to be a high strength or particularly corrosion resistant component. Therefore is may conveniently manufactured from lower strength materials such as aluminium or engineering plastics such as ABS or high molecular weight polyethylene using lower cost, higher volume processes such as die casting, extrusion, sintering or injection moulding. Alternatively, the yoke may be constructed as a multi-component assembly, comprising e.g., extruded aluminium guide blocks for each piston joined by a pressed steel connector that engages the return spring.

Figure 2:
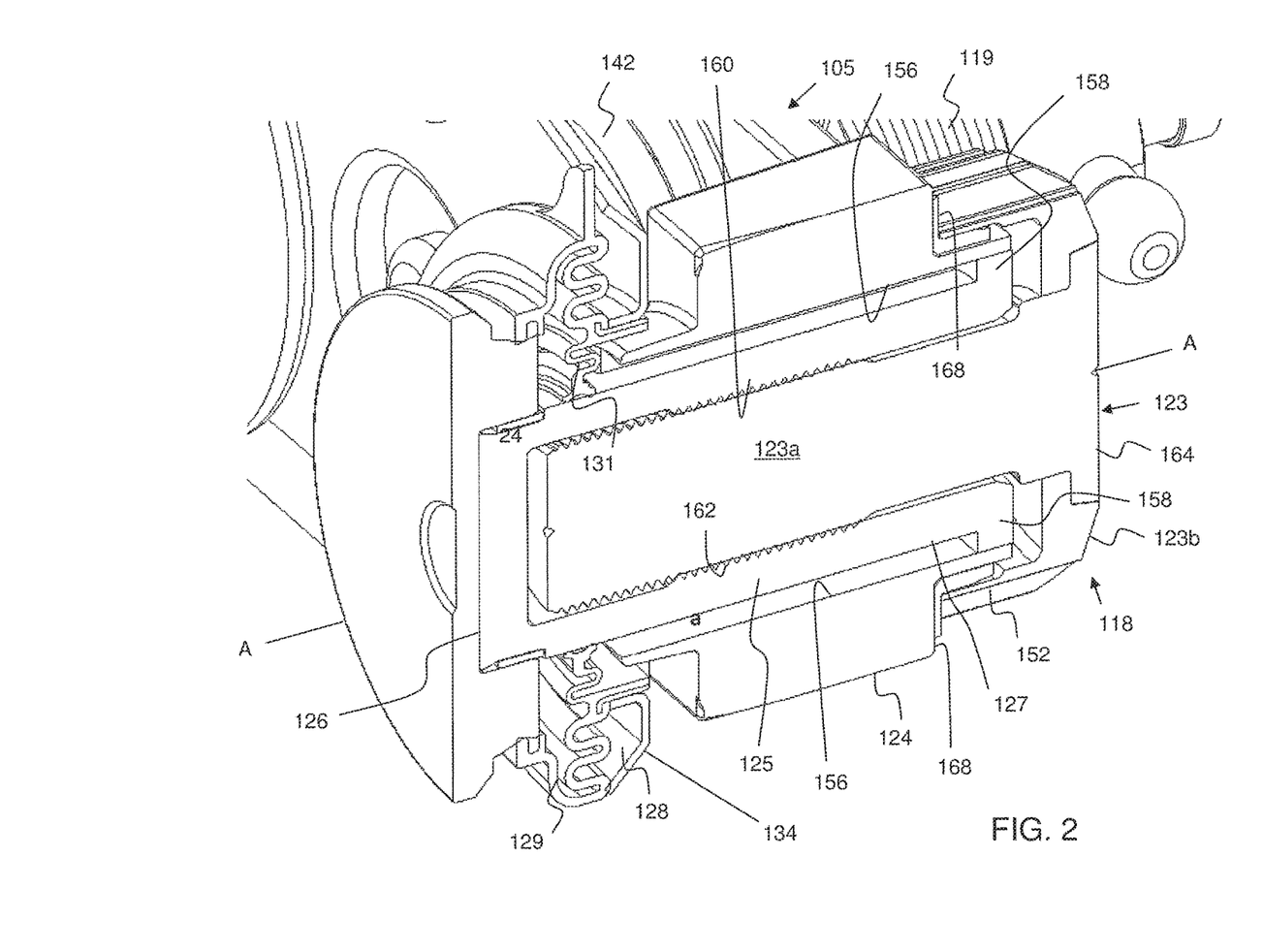
FIG. 2 is a vertical cross-section through a force transmission device according to an embodiment of the present invention.
Figure 3:
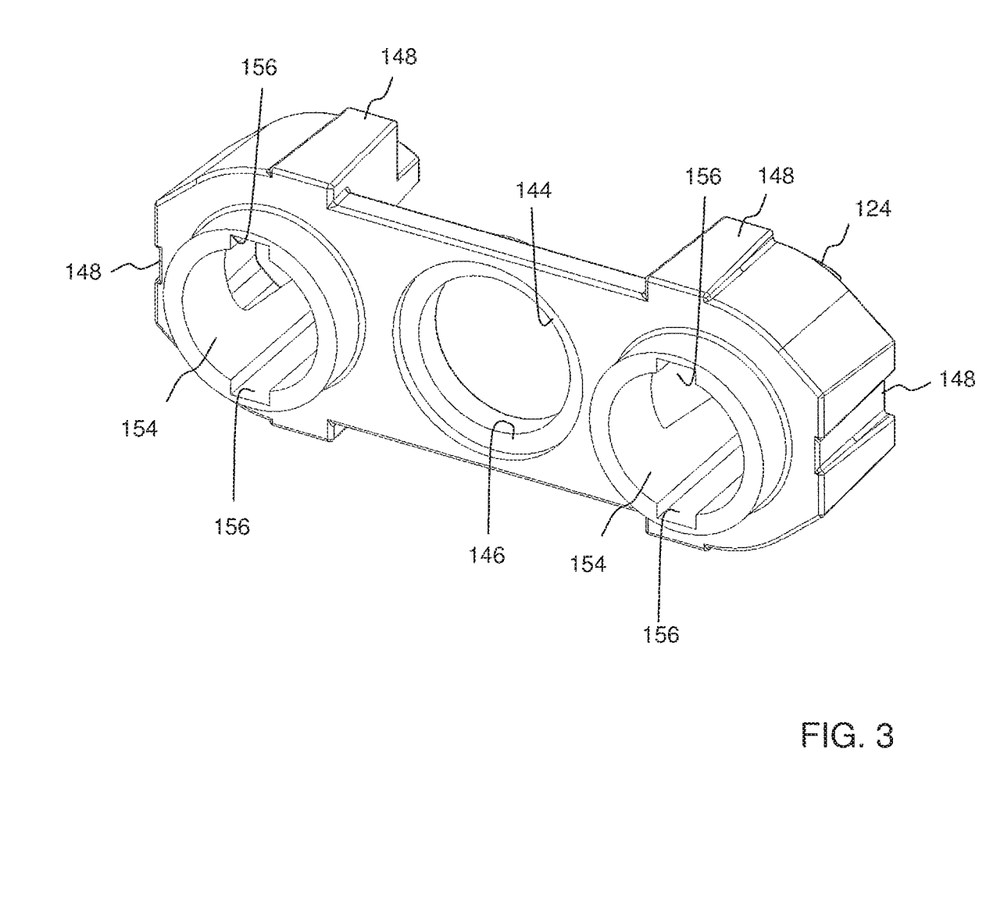
FIG. 3 is an isometric view of a yoke portion of the force transmission device of FIG. 2.
Figure 4:
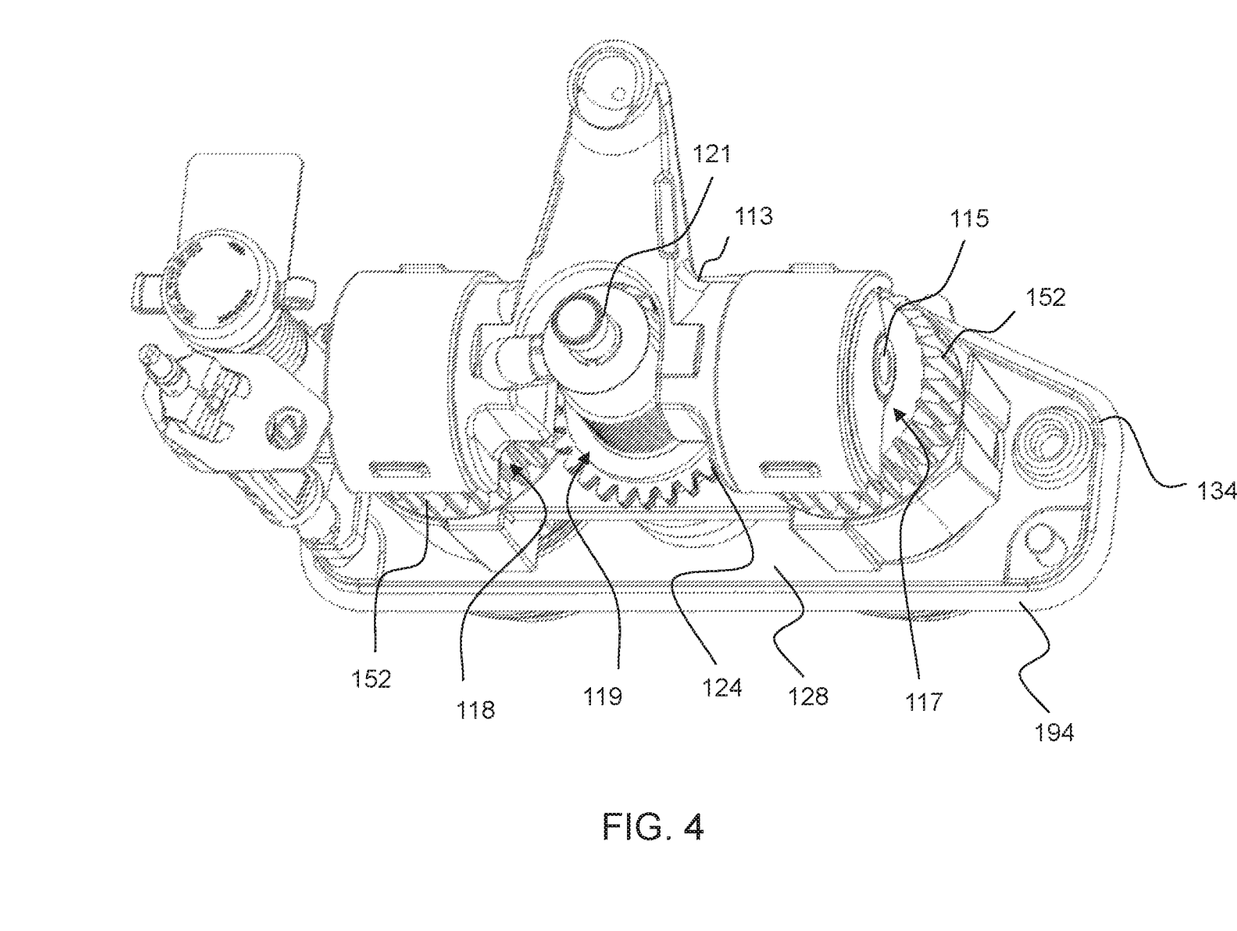
FIG. 4 is a perspective view of an assembly including the force transmission device of FIG. 2, an operating shaft and a cover plate.

The yoke 124 acts as a guide member for the piston assemblies 117 and 118 and includes a generally cylindrical guide form 154 located either side of the aperture 146 to receive each piston assembly. In this embodiment the guide forms do not require a separate bush. This is due to the fact that the yoke moves in unison with the piston assemblies during brake application and release, and there is only relative motion therebetween during wear adjustment, meaning there is less risk of wear occurring and bushes are not needed. This can be contrasted with the need for additional trilobular bushes in the prior art. I.e., the present invention has fewer components that are simpler to manufacture.

However, for adjustment of the length of the assemblies 117 and 118 to be achieved, it remains necessary for rotation of the pistons to be prevented. Thus, an anti-rotation formation is provided which includes first and second radially inward facing opposing slots 156 that extend parallel to axis A-A along the full length of forms 154.

The piston shafts 125 have a substantially cylindrical radially outer surface 127, but at an inboard end (the end closest the rotary actuating member) comprise opposing radial projections 158 arranged to be a complementary fit with the slots 156 so that the shafts may move freely along the length of the bushes 154, but not rotate. In order to fully accommodate for the wear of friction material, the length of the slots 156 should be equal or greater than the depth of friction material on both friction elements added together. It will be readily appreciated that in other embodiments only a single slot and projection may be needed, or more slots and projections provided. The shape and size of the slots and projections may be altered, e.g., to be rounded, triangular etc.

The generally circular cylindrical outer surface of the piston shafts enables a lower cost, simpler circular sliding secondary seal 131 to be used. Indeed, in this embodiment, the primary seal 129 and secondary seal 131 have been combined as single moulding including convolutions and a wiper surface of the secondary seal. In other embodiments two separate components may be used for the primary and secondary seals, in which case it may be possible to use standard off-the-shelf components for the secondary seal. The cylindrical surface of the piston is additionally easier and therefore cheaper to machine than the trilobular surface of the prior art. It will be appreciated that it is desirable for the axial length of the radial projections 158 to be minimised, as this in turn maximises the axial extent of the cylindrical surface 127 over which the secondary seal may slide. The arrangement described above further ensures that extension of both piston assemblies is synchronised, even if no friction element is present in the brake.

As in the prior art, the piston shafts 125 are hollow and have an internal thread 160. An inner tappet 123 is provided for both pistons and comprises a shaft 123*a* with external threads 162 that mesh with the internal threads 160. As a consequence, rotation of the inner tappet 123 causes extension of the piston assemblies 117 and 118 to account for wear of the friction elements and maintain a substantially constant running clearance.

The tappet assemblies 117 and 118 are adjusted by adjuster mechanism 119 located intermediate to the tappet assemblies and in driving connection thereto via gears 152 at the inboard ends of the inner tappets 123.

Figure 5:
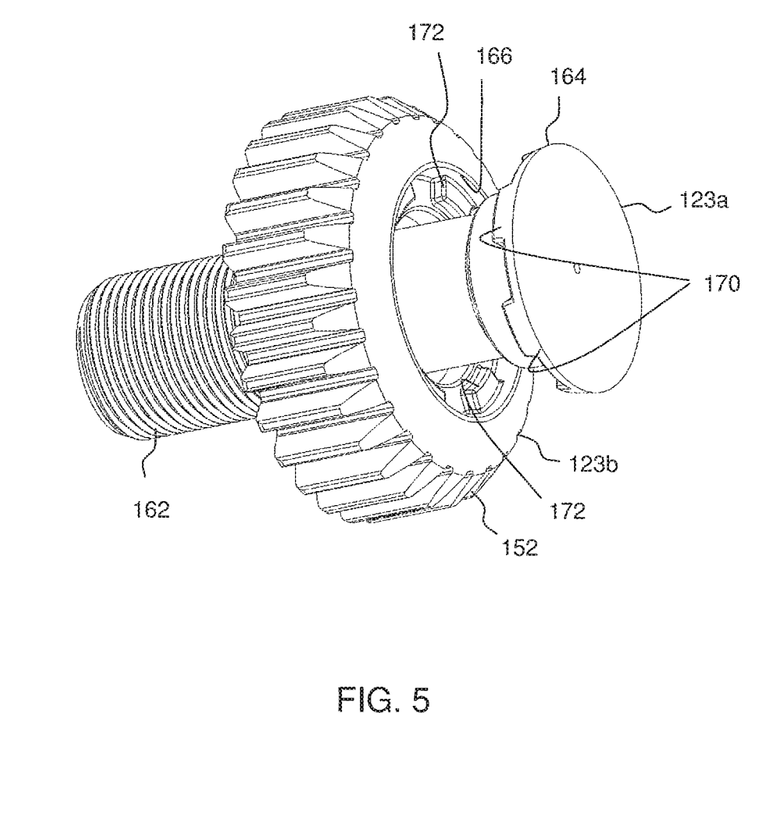
FIG. 5 is an exploded perspective view of an inner tappet portion of the force transmission device of FIG. 2 in accordance with an embodiment of the present invention.

In this embodiment the inner tappets 123 are constructed from two distinct pieces. The shaft portion 123*a* that transmits a thrust loading from the rollers 115 of the rotary actuating member 113 to the piston 125 forms one piece. The second piece 123*b* incorporates the gear 152 for transmission of rotary motion to the shaft 123*a*. In other embodiments a conventional one piece inner tappet may be used.

The shaft portion 123*a* is required to withstand a considerable axial load over a relatively small area from rollers 115 and 116, and also needs accurate machining of the threads 162. Therefore, the shaft portion 123*a* needs to be a high strength component, such as a steel forging, and may require additional treatment, such as induction hardening of its inboard surface in contact with the roller. In other embodiments the shaft may be a cast metal such as cast steel.

By contrast the present applicant has recognised that the second gear portion 123*b* may be formed from a relatively lower strength material than the shaft 123*a*, since the loads is sees in service are considerably lower only; the rotational drive from the adjuster assembly 119 and the return force from the spring 142.

As such the gear portion 123*b* is formed in this embodiment from a sintered metal e.g., steel or aluminium. In other embodiments, the gear portion may alternatively be formed from die cast metal, injection moulded metal, cast metal e.g., aluminium, or injection moulded plastics.

In some embodiments the two portions may be bonded together by e.g., welding or adhesive, but in a preferred embodiment this is not needed, due to the shape of the two components. In this embodiment the shaft portion 123*a* and the gear portion 123*a* comprise complementary abutting surfaces in a direction transverse the axis A-A, specifically an enlarged head 164 on the inboard end of the shaft portion, and a corresponding annular recess 166 on the inboard end of the gear portion 123*b*.

This arrangement restrains movement of the shaft toward an inboard end of the actuating member at which the actuating member is located. Since the return spring effectively acts on the gear portion 123*b* via an abutment surface 168 of the yoke 124, this means the gear is urged into contact with the head 164 at all times.

The shaft portion 123*a* and the gear portion additionally comprise complementary abutting surfaces in a circumferential direction so as to restrict relative rotation of the gear with respect to the shaft. In this embodiment, these surfaces are in the form of complementary castellations 170 and 172 on the shaft portion 123*a* and gear portion 123*b* respectively.

Figure 6:
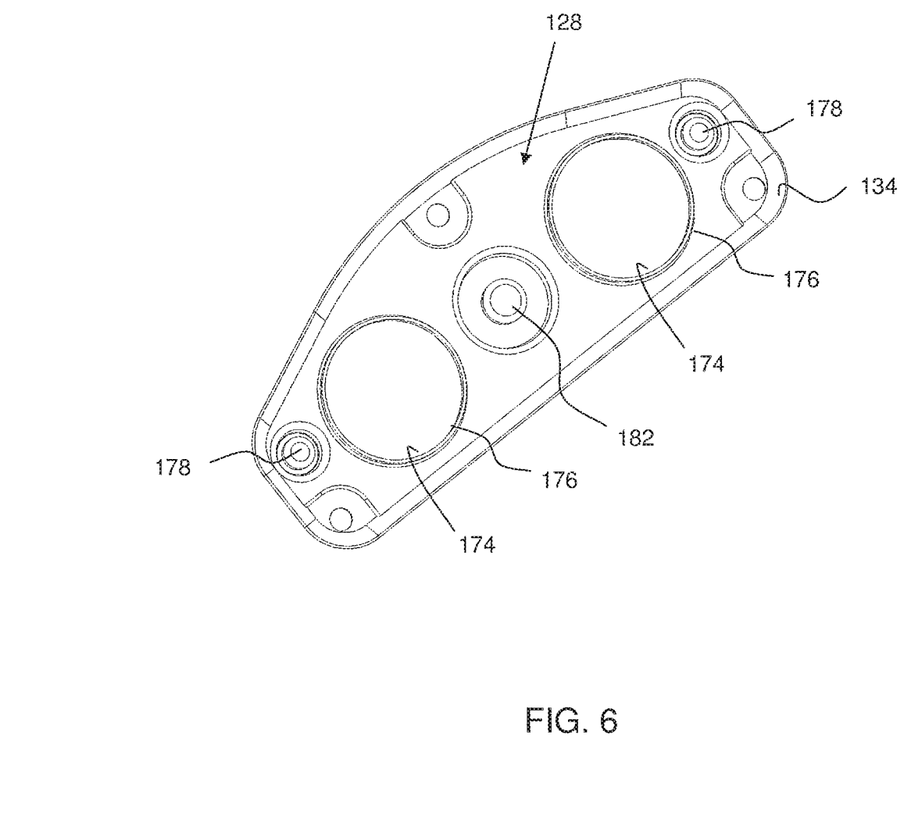
FIG. 6 is a perspective view of a cover plate of the present invention.
Figure 7:
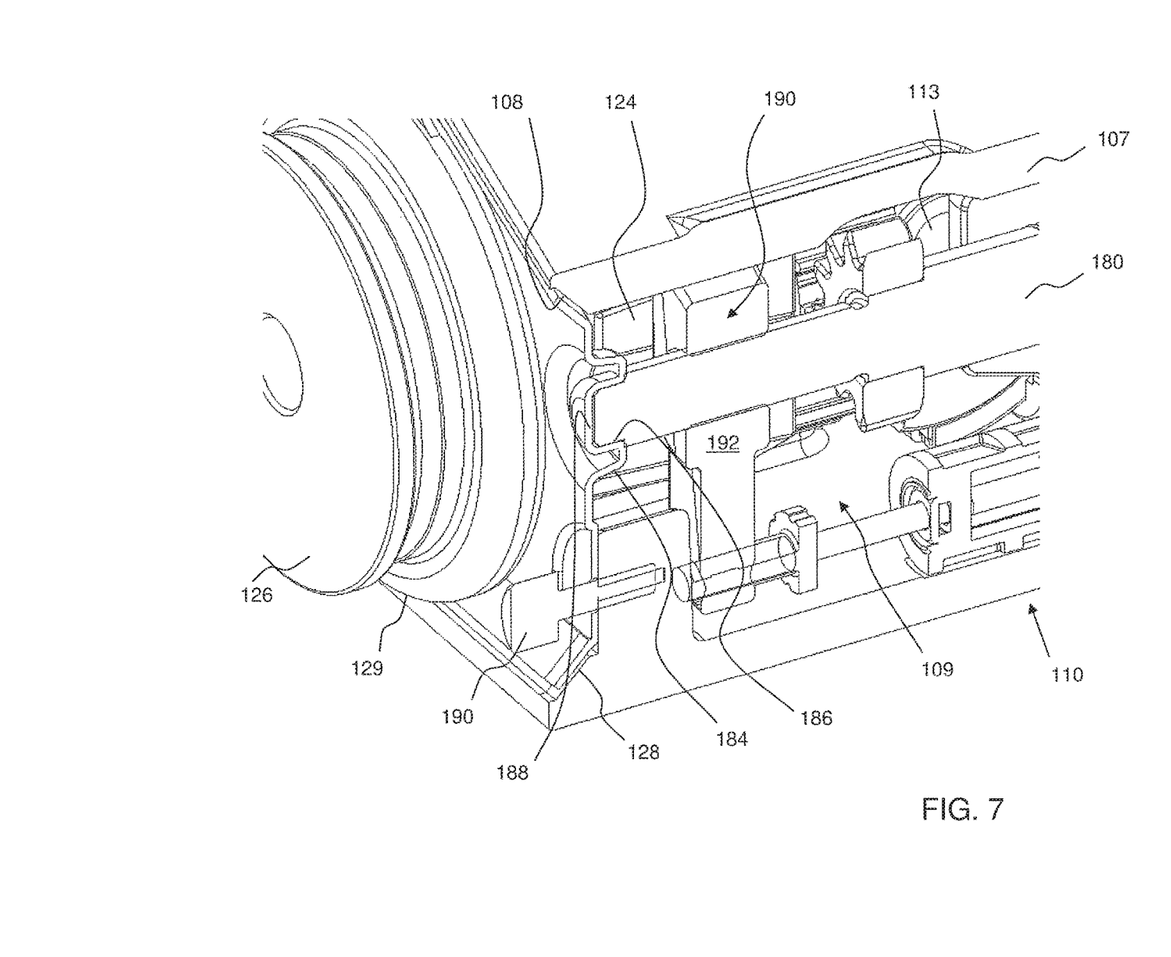
FIG. 7 is a vertical cross-sectional view of a brake caliper incorporating a cover plate of FIG. 6.

With reference in particular to FIGS. 6 and 7 it can be seen that the cover plate 128 is mounted over a rotor side (outboard) opening 108 in the housing 107 of the brake caliper 110. The cover plate has two apertures 174 therein through which the piston assemblies 117 and 118 extend and thereby are able move a friction element into contact with a brake rotor. The apertures are provide with peripheral lips 176 extending outboard.

In this embodiment the cover plate 128 is a pressed sheet metal component, preferably sheet steel with a suitable corrosion resistant coating such as an epoxy coating, zinc passivated coating or stainless steel. The plate 128 is preferably stamped from steel sheet having a thickness of 1.5-2 mm. In other embodiments the cover plate may be forged or cast.

By forming the cover plate as a pressing, it is possible to provide journal bearing forms therein to support rotating shafts of components mounted within the caliper housing 107 as part of the pressing process. These bearing forms are plain bearings, in this embodiment, and since the amount of rotation of the shafts that the bearings support is not substantial, wear thereof during the life of the brake is not significant. In other embodiments, it is nevertheless possible to provide a bushing on the bearing form.

In this embodiment the bearing forms 178 and 182 comprise a substantially circular wall 184 extending away from a major plane of the cover plate and a second circular wall 186 extending back towards the major plane and terminating in an end wall 188 to form a blind substantially cylindrical bore.

Bearing forms 178 are used in this embodiment to mount a shaft 180 of a manual brake de-adjuster mechanism as best seen in FIG. 7. The de-adjuster mechanism is used to rewind the piston assemblies before fitting new friction elements, and as such is only rotated once every few months or even years in normal service.

Figure 8:
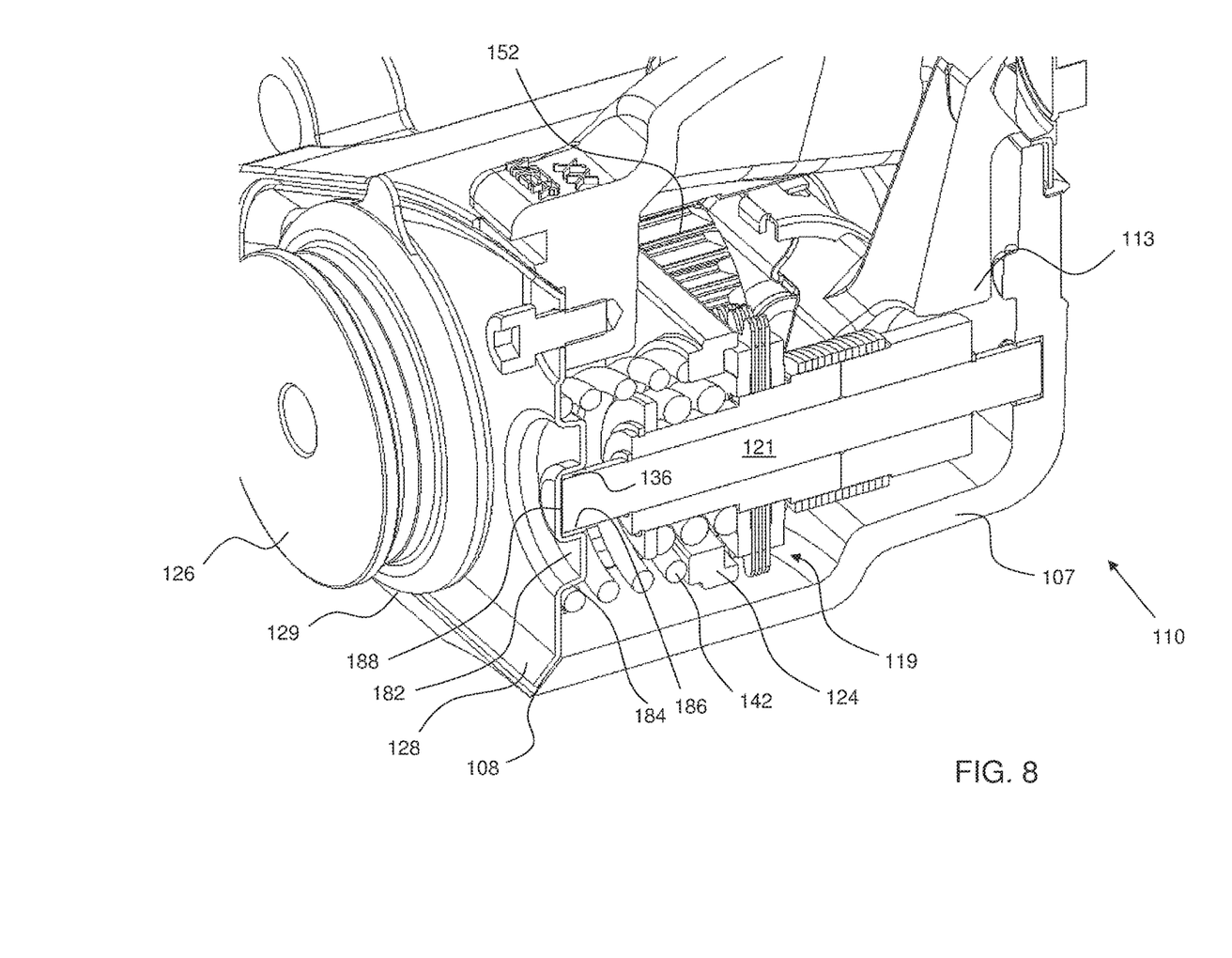
FIG. 8 is a further vertical cross-sectional view of a brake caliper incorporating a cover plate of FIG. 6.

With reference to FIG. 8, a further bearing form 182 is used to mount a wear adjuster shaft 21 of the wear adjuster assembly 119. This bearing form 182 also positions the return spring 142 on the cover plate 128. In this embodiment a bushing 136 is provided between the form and the shaft 121, as this is subjected to a greater amount of rotation than the de-adjuster mechanism.

In a preferred embodiment the peripheral lips 176 provide a surface that is directly overmoulded by the piston seals 129. Additionally, a peripheral seal 194 is overmoulded directly to the perimeter of the cover plate 128 in preferred embodiments. Furthermore, the cover plate 128 is mounted to the housing 107 in a preloaded state using bolts 190. This is made possible by virtue of an angled peripheral edge 134 on the cover plate that may be resiliently deflected. By pre-loading the cover plate an effective seal may be maintained if the housing deflects under extreme load to prevent ingress of contaminants into the housing. This may in turn enable a lighter-weight housing to be utilised. In alternative embodiments, the cover plate may be bonded directly to the housing using e.g., adhesive, spot welding, riveting or staking.

It will be appreciated that terms such as front and rear, upper and lower, inboard and outboard are used for ease of explanation, and should not be regarded as limiting.

Numerous changes may be made within the scope of the present invention. For example, the force transmission device may comprise a single piston, a different form of acting member may be used, and e.g., electromechanical actuation used in place of air actuation. An electrical adjuster assembly may be used in place of the mechanical one illustrated. Bushes may be provided between pistons and cylindrical guide forms.

What is claimed is:

1. A tappet comprising:
   a shaft portion for transmission of a thrust loading from an actuating member to a piston of a disc brake; and
   a gear portion for transmission of rotary motion to the shaft portion;
   wherein the gear portion is formed as a separate piece from the shaft portion, the gear portion is formed from a lower strength material than the shaft portion, and the shaft portion and the gear portion have complementary abutting surfaces in a circumferential direction so as to restrict relative rotation of the gear portion with respect to the shaft portion, wherein the complementary abutting surfaces are provided as complementary castellations on the shaft portion and the gear portion.

2. The tappet of claim 1 wherein the gear portion is formed from a selected one of the following materials:

sintered metal, die cast metal, injection molded metal, cast metal, and injection molded plastic.

3. The tappet of claim 1 wherein the shaft portion is formed from a selected one of the following materials: forged metal and cast metal.

4. The tappet of claim 1 wherein the shaft portion defines an axis and the complementary abutting surfaces are in a direction transverse to the axis.

5. The tappet of claim 4 wherein the complementary abutting surfaces restrain movement of the gear portion toward an inboard end of the actuating member at which the actuating member is located.

6. The tappet of claim 4 wherein the complementary abutting surfaces are provided as an enlarged head portion on an inboard end of the shaft portion and an annular recess on an inboard end of the gear portion.

7. The tappet of claim 1 wherein an external surface of the shaft portion includes a threaded region.

8. A force transmission device comprising:
   a tappet, wherein the tappet includes:
      a shaft portion for transmission of a thrust loading from an actuating member to a piston of a disc brake; and
      a gear portion for transmission of rotary motion to the shaft portion, wherein the gear portion is formed as a separate piece from the shaft portion, the gear portion is formed from a lower strength material than the shaft portion, and the shaft portion and the gear portion have complementary abutting surfaces in a circumferential direction so as to restrict relative rotation of the gear portion with respect to the shaft portion, wherein the complementary abutting surfaces are provided as complementary castellations on the shaft portion and the gear portion.

9. The force transmission device of claim 8 further comprising a resilient device to return the force transmission device to a brake-off position once the thrust loading is removed.

10. The force transmission device of claim 9 wherein force from the resilient device acts through the gear portion to pre-load the gear portion against the shaft portion.

11. The force transmission device of claim 8 wherein the shaft portion is threadably engaged with a second component such that relative rotation of the shaft portion and second component results in extension or contraction of the force transmission device to account for wear of an associated brake pad.

12. The force transmission device of claim 8 wherein the gear portion is a casting.

13. The force transmission device of claim 8 wherein the gear portion is an injection molded gear portion.

14. The force transmission device of claim 8 wherein the gear portion is made of plastic.

15. The force transmission device of claim 8 wherein the shaft portion is a casting.

16. The force transmission device of claim 8 wherein the shaft portion is a forging.

* * * * *